Figure 1:
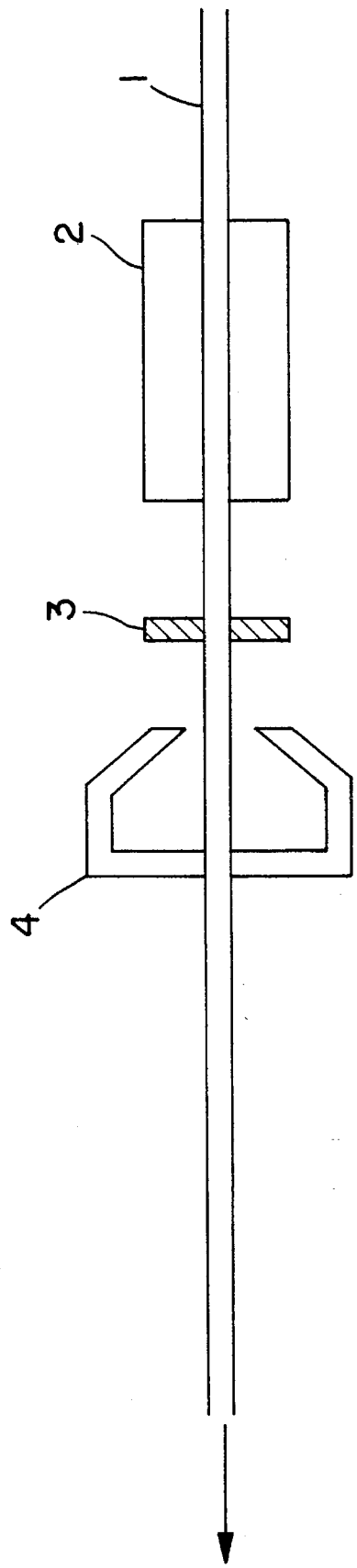

United States Patent [19]
Morley et al.

[11] Patent Number: 5,549,239
[45] Date of Patent: Aug. 27, 1996

[54] METHOD OF PROVIDING PARTICLE RETAINING METAL SURFACES AND FLUX RETAINING METAL COMPONENTS

[75] Inventors: Edward J. Morley, Kopervik, Norway; Morten Syslak, Onsted, Mich.

[73] Assignee: Norsk Hydro a.s, Oslo, Norway

[21] Appl. No.: 284,491

[22] PCT Filed: Feb. 8, 1993

[86] PCT No.: PCT/NO93/00023

§ 371 Date: Nov. 1, 1994

§ 102(e) Date: Nov. 1, 1994

[87] PCT Pub. No.: WO93/15868

PCT Pub. Date: Aug. 19, 1993

[30] Foreign Application Priority Data

Feb. 12, 1992 [NO] Norway .................................. 920546

[51] Int. Cl.$^6$ ................... B23K 1/20; B23K 103/10; B23K 31/02
[52] U.S. Cl. ................... 228/207; 228/261; 228/262.51; 228/254
[58] Field of Search .................................. 228/123, 207, 228/224, 262.51, 254, 223, 261; 427/424, 427; 118/308

[56] References Cited

U.S. PATENT DOCUMENTS

| | | | |
|---|---|---|---|
| 4,502,408 | 3/1985 | Hennechart et al. | 118/308 |
| 4,552,091 | 11/1985 | Feder | 118/308 |
| 4,571,352 | 2/1986 | Aoki | 427/431 |
| 4,615,479 | 10/1986 | Ohotoshi et al. | 228/214 |
| 4,708,751 | 11/1987 | Froebel et al. | 148/23 |
| 4,730,093 | 3/1988 | Mehta et al. | 118/308 |
| 4,774,106 | 9/1988 | Kozono | 228/223 |
| 5,100,045 | 3/1992 | Wiand | 228/119 |
| 5,174,490 | 12/1992 | Koisuka et al. | 228/223 |

*Primary Examiner*—Samuel M. Heinrich
*Attorney, Agent, or Firm*—Wenderoth, Lind & Ponack

[57] ABSTRACT

A prefluxed, flux retaining aluminum-based component is provided comprising a solidified coating layer having flux particles embedded into the coating layer. A method for producing such components comprises steps of applying a molten metallic coating to an aluminum-based component, maintaining the coating in a molten state, driving flux particles against the coating, and cooling the component to solidify the coating and thereby fix the particles firmly in the solidified coating.

3 Claims, 1 Drawing Sheet

METHOD OF PROVIDING PARTICLE RETAINING METAL SURFACES AND FLUX RETAINING METAL COMPONENTS

The present invention relates to a method of providing particle retaining metal surfaces and more particularly to fluxing of aluminum-based components in order to make possible intimate wetting of their surfaces through removal of oxide films from the surfaces in a subsequent joining of the components, and to the resulting flux retaining metal components.

When aluminum or aluminum alloy (hereinafter both are denominated as "aluminum-based" so as to indicate the possible use of either) components are assembled, for example into a structure like a heat exchanger, they are conventionally fluxed prior to brazing in ambient air or neutral atmosphere such as nitrogen. Fluxes are employed to disrupt/remove a fine film of aluminum oxide readily formed on the aluminum surface.

This oxide film interferes with processes for applying a metallic coating to the surface as well as processes for joining the components by soldering, brazing or welding. The oxide film has to be removed and its reformation prevented in order to establish the metal-to-metal bonds.

Many alternative fluxes are conventionally used to eliminate the oxide layer. Chloride-based fluxes break up the oxide film, but must be subsequently rinsed away due to their hygroscopic and corrosive nature. Fluoride-based fluxes, e.g. mixture of potassium tetrafluoroaluminate and hexafluorotripotassium aluminate, are advantageous since they leave no corrosive residues.

A flux is normally suspended in water or another solvent, and coated onto surfaces of aluminum-based components by spraying or dipping. The flux application is normally part of an on-line process immediately prior to the joining operation. Conventionally, flux application inherently requires an additional step of drying in order to remove water or solvents from the components prior to heating to a brazeable temperature at which a brazing metal melts and the flux is active in order to join together two components. Such drying, however, disrupts the efficiency of the on-line process.

Furthermore, fluxing of the assembled components does not ensure a uniform distribution and access of the flux to the whole surface of the joined components.

An alternative method obviating use of a drying step is electrostatic deposition of dry flux powder upon the components prior to brazing. The electrostatic deposition is, however, inadequately bonded or adherent to permit storage or significant transportation of the components for any significant period of time prior no brazing. Consequently, the conventional art is limited to on-line fluxing.

However, industrial and transportation developments are such that it may be very desirable to extrude or otherwise fabricate and preflux components at one site or at one particular time, and braze them at another location.

U.S. Pat. No. 4,571,352 discloses a method of dipping an aluminum pipe into a molten brazing filler metal through a layer of floated molten flux. Thus a simultaneous coating of Al-pipes with brazing filler metal and application of a flux layer is claimed, avoiding use of brazing sheets in assembling of the components. The disclosed method based on retraction of coated pipes through a molten flux having a solidified surface layer has, however, several drawbacks. First of all, the flux is not properly bonded and can be mechanically removed so that a uniform distribution of firmly adhered flux material is not achieved. Furthermore, the activity of the adhered flux material after repeated melting is deteriorated so that an additional fluxing operation becomes necessary prior to the brazing operation.

It is therefore an object of the present invention to provide a prefluxed aluminum-based component applying conventional brazing/soldering flux in such a manner that the flux remains in place during subsequent transportation, storage and assembly of the coated components, thereby obviating any need for further application of flux.

Another object of the present invention is to provide components having flux present and uniformly distributed at each joint location.

Still another object of the present invention is to provide a method of fluxing aluminum-based components, eliminating the necessity of a drying step.

These and other objects and features of the present invention are achieved by driving solid particles of flux onto or into a liquefied coating layer upon a component surface, and then solidifying the coating layer to embed or fix the flux firmly to or in the solidified coating layer.

The invention will now be described in more details referring to the accompanying drawing, FIG. 1, showing schematically sequential operations according to a preferred embodiment of the invention.

The present invention provides a prefluxed flux retaining aluminum-based component using a metallic coating layer applied to the component as a matrix to tightly hold or bond flux particles to the component surface. Such coating layers, preferably of zinc or zinc aluminum alloy in view of their corrosion protection properties and low melting point, are presently applied in order to improve the corrosion protection or to provide a filler metal for joining of the components, e.g. in manufacturing of heat exchangers.

It has been found that by suitable operation of the process conditions the coating layer can be maintained in a molten state for a period of time sufficient for conducting a subsequent fluxing step. FIG. 1 shows schematically the coating line and experimental equipment used for conducting the fluxing. An aluminum-based component, e.g. a hollow aluminum shape or tubing 1 is passed through a molten metallic coating material (bath) 2 and past a calibration device 3 to remove the excess of the deposited coating material. By controlling the temperature it was possible to maintain the coating material in a molten state and thus to cause powdered flux material to adhere to the molten surface by impingement of flux particles being blown through nozzles (spraying device) 4 towards the molten surface layer. An adherent layer of flux particles firmly fixed in the solidified coating material was achieved upon a final cooling step.

EXAMPLE

An aluminum tube was hot-dip galvanized in the above described coating line applying zinc aluminum alloy (ZnAl5%) as a coating material. The temperature after calibrating was kept in excess of 385° C. and finely dispersed flux particles (mixture of potassium tetrafluoroaluminate and hexafluorotripotassium aluminate) were blown towards the molten coating layer.

This resulted in the formation upon the coating layer of an adherent layer of flux material which was fixed in place when the tube was cooled sufficiently to solidify the coating layer. Following subsequent water quenching, the presence of flux was visually confirmed by darkening of the surface of the tube, thereby indicating that the flux was firmly and securely bonded to the surface. Evaluation of the fluxed surface was made using a scanning electron microscope and glow discharge mass spectrometry (GDMS). Flux material was determined to be present on the surface of the coating layer since fluoride, which would otherwise not have been present, was detected there.

Subsequently conducted brazing tests, based on samples comprising such Al-tubes coated with a 3–4µ layer of ZnAl5%, gun sprayed with flux, connected to finstock and brazed at 610° C., resulted in excellent fillets (joints), thus eliminating the need for any further application of flux.

The invention utilizes a solidifying coating layer as a matrix to tightly hold or bond the particles in place near or about the component surface. As flux particles impinge the coating layer and come to rest, they stick. The flux particles are glued or frozen in place by the solidification of the coating layer. This provides a sufficiently tight bond to make possible prolonged storage or transportation of the prefluxed components.

The coating layer may be provided by any conventional method as e.g. dipping, splashing, spraying, etc. It is also possible to conduct the flux deposition as a separate process step. In such case it is necessary to preheat and remelt the solidified coating layer prior to its impingement by flux articles.

While a fluoride-based flux was used in the inventor's trials, any other flux in particle form may be used in accordance with the inventive concept. The inventive concept will work well with, for example, any halogen-based flux. If the component is to be quenched in water, then a relatively water insoluble flux should be used.

The manner in which the flux particles are applied in accordance with the invention may vary. The flux particles may form either a continuous or non-continuous layer upon or even within the coating layer. A uniform flux distribution is, however, preferred for the flux to most reliably perform its function. A fluidized bed may be advantageously applied to ensure such uniform distribution of flux particles on components exhibiting a complicated outer shape. Ensuring that the flux is applied to the whole surface of the components prior to their assembling allows e.g. more dense fin spacing in manufacturing of the exchange cores.

The inventive concept is that the solid particles are set or fixed firmly in the mass of the coating layer. Even a superficial contact of a particle surface with the molten coating layer produces a sufficiently firm connection between the particles and the coating layer when the latter solidifies. Impingement velocity, particle size and coating layer density and even depth can be manipulated so as to affect the extent of particle depth within the coating layer.

Other solid particles could be applied additionally (or instead of flux particles) according the the present method, e.g. powdered zinc, silicon or their Al-alloys (AlZnSi), increasing the amount of filler metal.

We claim:

1. A method of providing a metal component having particle retaining surface, which comprises steps of providing a molten metallic coating on the component, impinging solid particles against said molten coating, and cooling the component so as to solidify the coating and thereby fix the particles firmly in the solidified coating, wherein the impinging of solid particles against the molten coating comprises fluxing of aluminum-based components by means of halogen-based flux particles.

2. A method according to claim 1, wherein the impinging of solid particles is conducted by blowing of the particles by means of a spraying device.

3. The method according to claim 1, wherein the fluxing is a continuous process in line with coating of the component.

* * * * *